(12) United States Patent
Chan et al.

(10) Patent No.: US 12,394,067 B2
(45) Date of Patent: Aug. 19, 2025

(54) DEVICE AND METHOD FOR CAPTURING AND ANALYZING A MOTION OF A USER

(71) Applicant: Logistics and Supply Chain MultiTech R&D Centre Limited, Pok Fu Lam (HK)

(72) Inventors: Kin Sun Chan, Pok Fu Lam (HK); Yan Nei Law, Pok Fu Lam (HK); Ka Lun Fan, Pok Fu Lam (HK)

(73) Assignee: Logistics and Supply Chain MultiTech R&D Centre Limited, Pok Fu Lam (HK)

( * ) Notice: Subject to any disclaimer, the term of this patent is extended or adjusted under 35 U.S.C. 154(b) by 612 days.

(21) Appl. No.: 17/704,568

(22) Filed: Mar. 25, 2022

(65) Prior Publication Data
US 2023/0306616 A1    Sep. 28, 2023

(51) Int. Cl.
*G06T 7/246* (2017.01)
*A63B 24/00* (2006.01)
*G06T 7/215* (2017.01)
*G06T 7/579* (2017.01)
*G06T 7/70* (2017.01)

(52) U.S. Cl.
CPC .......... *G06T 7/248* (2017.01); *A63B 24/0062* (2013.01); *G06T 7/215* (2017.01); *G06T 7/579* (2017.01); *G06T 7/70* (2017.01); *A63B 2220/05* (2013.01); *A63B 2220/806* (2013.01); *G06T 2207/10021* (2013.01); *G06T 2207/10024* (2013.01); *G06T 2207/10028* (2013.01); *G06T 2207/20021* (2013.01); *G06T 2207/20092* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| | | | | |
|---|---|---|---|---|
| 2007/0285419 | A1* | 12/2007 | Givon | G06T 7/251 348/46 |
| 2010/0197399 | A1* | 8/2010 | Geiss | G06T 7/251 463/32 |
| 2010/0277489 | A1* | 11/2010 | Geisner | A63F 13/42 345/581 |
| 2010/0303289 | A1* | 12/2010 | Polzin | G06V 40/103 348/135 |

(Continued)

*Primary Examiner* — Delomia L Gilliard
(74) *Attorney, Agent, or Firm* — Renner, Kenner, Greive, Bobak, Taylor & Weber

(57) ABSTRACT

A method for capturing and analyzing a motion of a user includes capturing a motion of a user represented by an RGB moving image and depth data, obtaining 2D skeletal data based on the RGB moving image, converting the 2D skeletal data to 3D skeletal data by mapping the 2D skeletal data with corresponding depth data, determining one or more key poses of the motion of the user based on a preset condition for each of the key poses, obtaining the one or more key poses of the motion of the user and segmenting a motion sequence by the key poses into segments, sampling each segment and aligning each segment with a corresponding segment of a set of standard key poses, and comparing trajectories obtained based on the aligned segments between the one or more key poses of the motion of the user and the set of standard key poses.

15 Claims, 2 Drawing Sheets

(56) References Cited

U.S. PATENT DOCUMENTS

| | | | | |
|---|---|---|---|---|
| 2012/0056800 A1* | 3/2012 | Williams | ............. | G06V 40/103 |
| | | | | 345/156 |
| 2012/0214594 A1* | 8/2012 | Kirovski | ............... | A63F 13/814 |
| | | | | 463/36 |
| 2013/0089845 A1* | 4/2013 | Hutchison | ........... | G09B 19/003 |
| | | | | 434/257 |
| 2014/0147820 A1* | 5/2014 | Snow | ................ | G09B 19/0038 |
| | | | | 434/247 |
| 2014/0270351 A1* | 9/2014 | Hoof | ....................... | G06T 7/251 |
| | | | | 382/103 |
| 2014/0358475 A1* | 12/2014 | Boulkenafed | ......... | G01B 21/16 |
| | | | | 702/152 |
| 2016/0220438 A1* | 8/2016 | Walsh | .............. | A63B 23/03508 |
| 2017/0000386 A1* | 1/2017 | Salamatian | ............ | G16H 10/60 |
| 2017/0368413 A1* | 12/2017 | Shavit | ................ | A63B 24/0075 |
| 2018/0070864 A1* | 3/2018 | Schuster | ................ | G16H 40/63 |
| 2019/0295278 A1* | 9/2019 | Kim | ...................... | G06T 11/001 |
| 2020/0197744 A1* | 6/2020 | Schweighofer | ...... | A61B 5/1128 |
| 2020/0222757 A1* | 7/2020 | Yang | ...................... | G06V 40/23 |
| 2020/0402638 A1* | 12/2020 | Song | .................... | A61B 5/0022 |
| 2021/0019507 A1* | 1/2021 | Brookshire | .......... | G06V 10/764 |
| 2022/0072377 A1* | 3/2022 | Russell | .................. | G06V 10/25 |
| 2022/0079510 A1* | 3/2022 | Robillard | ............ | G06V 40/103 |
| 2022/0080260 A1* | 3/2022 | Zhang | .................. | A63B 24/0006 |
| 2022/0108561 A1* | 4/2022 | Groß | ...................... | G06V 40/25 |
| 2022/0358309 A1* | 11/2022 | Lin | ........................ | G06V 20/46 |
| 2023/0139841 A1* | 5/2023 | DiMarco | .................. | G06T 7/75 |
| | | | | 345/419 |
| 2024/0212292 A1* | 6/2024 | Spooner | ................. | A61B 5/743 |
| 2024/0215912 A1* | 7/2024 | Tadi | ....................... | G06V 40/20 |
| 2024/0279617 A1* | 8/2024 | Kim | ....................... | C12M 35/04 |

* cited by examiner

DEVICE AND METHOD FOR CAPTURING AND ANALYZING A MOTION OF A USER

TECHNICAL FIELD

The present invention relates to a device and a method for capturing and analyzing a motion of a user. In particular, the present invention provides a device and a method for capturing and analyzing a motion of a user for use in rehabilitation or daily training.

BACKGROUND

Exercises and health trainings are beneficial for people to stay healthy. In particular, rehabilitation training is important to patients for their speedy recovery. Normally, a trainer sets a list of exercises and a patient/trainee follows the list of exercises. The trainer can check trainee's performance through face-to-face sessions or a recorded video of trainee's performance. However, when workload of the trainer is high, it would be difficult for the trainer to conduct detailed checking so the trainer may not be able to provide proper feedback to the trainer.

In the light of the foregoing, there has been a need to provide an improved method and device for capturing and analysing a motion of a user to help patients/trainees to do more efficient and effective training for their recovery or daily training.

SUMMARY OF THE INVENTION

According to an aspect of the present invention, there is provided a method for capturing and analyzing a motion of a user. The method includes capturing a motion of a first user represented by an RGB moving image and depth data (step A), obtaining 2D skeletal data based on the RGB moving image for each frame (step B),
converting the 2D skeletal data to 3D skeletal data by mapping the 2D skeletal data with corresponding depth data for each frame (step C), determining one or more key poses of the motion of the first user based on a preset condition for each of the key poses (step D), obtaining the one or more key poses of the motion of the first user and segmenting a motion sequence by the key poses into segments (step E), sampling each segment and aligning each segment with a corresponding segment of a set of standard key poses (step F), and comparing trajectories obtained based on the aligned segments between the one or more key poses of the motion of the first user and the set of standard key poses (step G).

In some embodiments, the method may further include, before step A, the step of capturing a motion of a second user represented by an RGB moving image and depth data, the step of obtaining 2D skeletal data based on the RGB moving image for each frame for the second user, and the step of converting the 2D skeletal data to 3D skeletal data by mapping the 2D skeletal data with corresponding depth data for each frame for the second user.

In some embodiments, step D may include determining the one or more key poses of the motion of the first user based on a preset condition for each of the key poses selected by the second user.

In some embodiments, step D may include automatically determining the one or more key poses of the motion of the first user based on its motion sequence.

In some embodiments, step G may include calculating difference between the 3D skeletal data of the one or more key poses by the first user and 3D skeletal data of the set of standard key poses for each segment.

In some embodiments, the method may further include step H of determining if the difference is within a predetermined threshold.

In some embodiments, each segment may start from one key pose and end at another key pose.

According to another aspect of the present invention, there is provided a device for capturing and analyzing a motion of a user. The device includes a depth image capturing device for capturing a motion of a first user represented by an RGB moving image and depth data, and a processor connected to the depth image capturing device. The processor is configured to obtain 2D skeletal data based on the RGB moving image for each frame, convert the 2D skeletal data to 3D skeletal data by mapping the 2D skeletal data with corresponding depth data for each frame, determine one or more key poses of the motion of the first user based on a preset condition for each of the key poses, obtain the one or more key poses of the motion of the first user and segment a motion sequence by the key poses into segments, sample each segment of the key poses of the motion and align each segment with a corresponding segment of a set of standard key poses, and compare trajectories obtained based on the aligned segments between the one or more key poses of the motion of the first user and the set of standard key poses.

In some embodiments, the depth image capturing device may be further configured to capture a motion of a second user represented by an RGB moving image and depth data.

In some embodiments, the processor may be further configured to obtain 2D skeletal data based on the RGB moving image for each frame for the motion of the second user, and convert the 2D skeletal data to 3D skeletal data by mapping the 2D skeletal data with corresponding depth data for each frame.

In some embodiments, the processor may be further configured to determine the one or more key poses of the motion of the first user based on a preset condition for each of the key poses selected by the second user.

In some embodiments, the processor may be further configured to automatically determine the one or more key poses of the motion of the first user based on its motion sequence.

In some embodiments, the processor may be further configured to compare trajectories obtained based on the aligned segments between the one or more key poses of the motion of the first user and the set of standard key poses, by calculating difference between the 3D skeletal data of the one or more key poses by the first user and 3D skeletal data of the set of standard key poses for each segment.

In some embodiments, the processor may be further configured to determine if the difference is within a predetermined threshold.

In some embodiments, each segment may start from one key pose and end at another key pose.

In some embodiments, the processor may be connected to an audio-visual presenting device to show the motion of the first user and/or the motion of the second user.

In some embodiments, the processor may further be configured to send the audio-visual presenting device a result of the comparison between the trajectories of the one or more key poses of the motion of the first user and the set of standard key poses for display.

Other features and aspects of the invention will become apparent by consideration of the following detailed description, drawings and claims.

Before any independent constructions of the invention are explained in detail, it is to be understood that the invention is not limited in its application to the details of construction and the arrangement of components set forth in the following description or illustrated in the following drawings. The invention is capable of other independent constructions and of being practiced or of being carried out in various ways. Also, it is to be understood that the phraseology and terminology used herein is for the purpose of description and should not be regarded as limiting.

BRIEF DESCRIPTION OF DRAWINGS

These and other features of the invention will become more apparent from the following description, by way of example only, with reference to the accompanying drawings, in which.

Before any embodiments of the invention are explained in detail, it is to be understood that the invention is not limited in its application to the details of embodiment and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting.

DETAILED DESCRIPTION OF PREFERRED EMBODIMENTS

Hereinafter, embodiments of the present disclosure will be described in detail with reference to the drawings.

Exercises and health trainings are important to patients for rehabilitation as well as healthy people. The present invention provides a device and a method for capturing and analyzing a motion of a user, which can help those people to do proper exercise or training.

Figure 1:
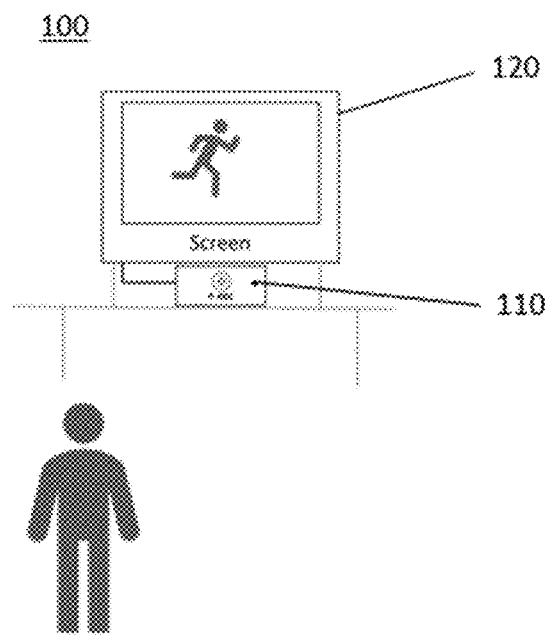
FIG. 1 is a schematic diagram of a system environment where a device for capturing and analyzing a motion of a user according to an embodiment of the present invention can be used.

FIG. 1 shows an example system environment (100) where a device (110) for capturing and analyzing a motion of a user according to an embodiment can be used. The device (110) may include a depth image capturing device and a processor (shown in FIG. 2). The device (110) can be connected to an audio-visual presenting device (120). A first user (for example, a patient or a trainee) can use the device (110) to record his/her motion (for example, a part or whole of exercise or training) and get feedback through the audio-visual presenting device (120). For example, a result of analyzing the first user's motion can be outputted by the audio-visual presenting device (120). The device (110) is particularly useful when the user is unable to get feedback in person or in real time from an expert or a trainer.

Figure 2:
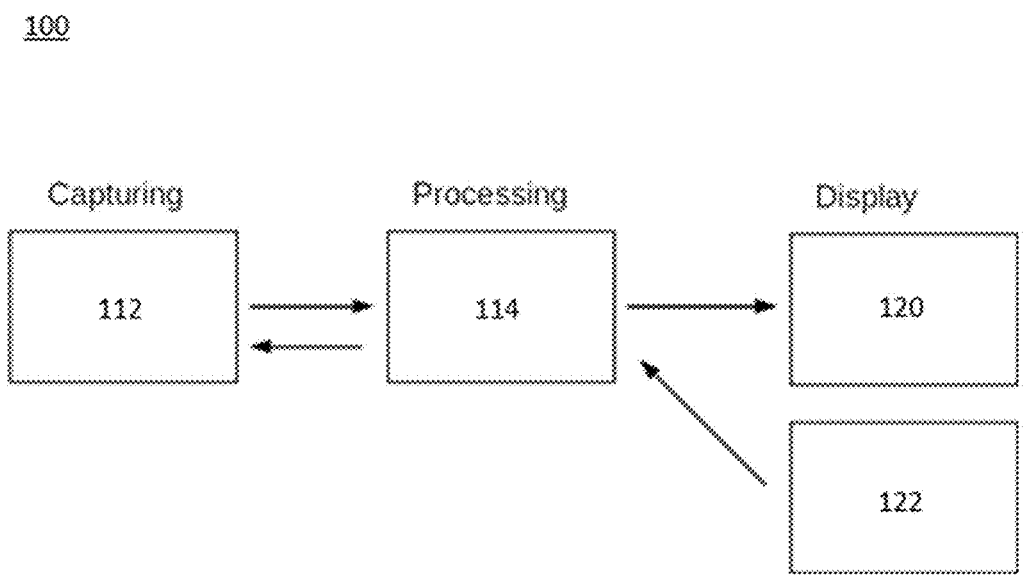
FIG. 2 is a block diagram showing a device for capturing and analyzing a motion of a user and an audio-visual presenting device according to an embodiment of the present invention.

FIG. 2 shows a block diagram showing the system (100) including the device (110) for capturing and analyzing a motion of a user and the audio-visual presenting device (120). The device (110) includes a depth image capturing device (112) and a processor (114). The depth image capturing device (112) captures a motion of a user. The captured motion of the user can be represented by an RGB moving image and depth data. That is, a motion sequence of the first user is recorded as the RGB moving image (i.e., RGB video) and the depth data. The depth image capturing device (112) may be a depth camera which includes a RGB camera, and right and left imagers to calculate depth, as an example. The depth camera (112) can capture a motion of a user by using the RGB camera with depth information obtained from the right and left imagers synchronously. In an example, the resolution of the captured video can be 424×240 and the frame rate may be up to 30 fps.

The processor (114) is connected to the depth camera (112), and performs processing and analyzing information obtained by the depth camera (112). That is, the processor (114) obtains 2D skeletal data based on the RGB moving image (i.e., RGB video) for each frame. The 2D skeletal data can be detected by using any known method. Then, the processor (114) converts the 2D skeletal data to 3D skeletal data by mapping the 2D skeletal data with corresponding depth data for each frame. For example, the 2D skeletal data may include 2D skeletal coordinates, and the 2D to 3D conversion is applied by mapping the 2D skeletal coordinates with the corresponding depth data, which is also known as z values, for each frame.

According to an embodiment, a similar process, i.e., the process including capturing of the motion of the first user, obtaining the 2D skeletal data, and converting the 2D skeletal data to the 3D skeletal data for the motion of the first user, can be performed for a second user. This process for the second user can be conducted by another separate device for capturing and analyzing a motion of a user provided to the second user. Preferably, the process for the second user can be conducted before the process for the first user is performed. In other words, the second user's motion can be pre-recorded and his/her motion sequence is extracted in advance. Here, the second user may be an expert or a trainer who has ability to analyze the motion of the first user and give feedback to the first user.

The process performed for the second user is similar to the process performed for the first user as described above. For example, a depth camera captures a motion of the second user. A processor obtains 2D skeletal data based on the RGB moving image (i.e., RGB video) for each frame. Then, the 2D skeletal data is converted to 3D skeletal data by mapping the 2D skeletal data with corresponding depth data for each frame.

After obtaining the 3D skeletal data for the first user and the second user, the processor (114) determines one or more key poses of the motion of the first user based on a preset condition for each of the key poses. The preset condition for each of the key poses can be selected by the second user. Or, the one or more key poses can be determined automatically based on a motion sequence. For example, if a key pose is raising up a hand, the key pose of the first user is found with the hand location higher than that of the other poses. After determining the one or more key poses, the processor (114) obtains the one or more key poses of the motion of the first user, and then segments a motion sequence by the key poses into segments. In other words, the motion of the first user includes one or more key poses according to its motion sequence and can be segmented by the key poses into segments. Here, each segment may start from one key pose and end at another, e.g. the next, key pose.

The processor (114) then samples each segment and aligns each segment with a corresponding segment of a set of standard key poses. In one embodiment, the set of standard key poses may be one or more key poses of a motion sequence of the second user (i.e., an expert or a trainer). Those standard key poses are used for segmenting the motion sequence into segments. Each segment of the key poses of the first user is aligned with the corresponding segment of the key poses of the second user. The alignment can be performed by using, for example, Procrustes analysis, which calculates translation and optimal rotation by distribution of a skeleton in each frame.

Once the aligned segments are extracted for the first user and the second user, their trajectories can be obtained based on the aligned segments and compared between the one or more key poses of the motion of the first user and the set of standard key poses. Their trajectories can be compared by calculating difference between the 3D skeletal data of the one or more key poses by the first user and the 3D skeletal data of the set of standard key poses for each segment. For example, difference of each keypoint on each skeleton in the segment is calculated.

If the difference is within a predetermined threshold, the corresponding keypoint is considered as a matched point. In one example, the result of comparison can be represented by the score which is calculated by counting the number of the matched points over the total points in each segment. The final score can be provided as the average of the scores in the segments.

As shown in FIG. 2, the processor (114) is connected to the audio-visual presenting device (120) to show the motion of the first user and/or the motion of the second user. The audio-visual presenting device (120) also shows the result of the aforesaid comparison. The audio-visual presenting device (120) is connected with the processor (114) to receive the captured motion from the depth camera (112) and the result of comparison from the processor (114). For example, a menu can be shown on the audio-visual presenting device (120) so that a user (for example, the first user) can choose which exercise to perform, e.g., by using any input unit (for example, a keyboard) connected to the processor (114). Then, the related video performed by an expert (i.e. the second user) and instructions for the user are displayed on the audio-visual presenting device (120). After the motion of the user is captured and analysed, the analysing results (for example, similarity score between the user and the expert and/or the most different parts in the user pose) are displayed on the audio-visual presenting device (120). A graphical user interface (GUI, 122) can be adopted to allow users to interact with the device (110) for user input.

In one example, the audio-visual presenting device (120) may be an electronic display device or a screen on an electronic device such as a television. However, a skilled person would understand that the other devices such as a computer, a tablet, a smartphone, etc. can also be used based on what display devices the processor (140) can support. In one example, the connection between the processor (114) and the audio-visual presenting device (120) may be a wired connection such as HDMI connection, but is not limited to it.

According to another aspect of the invention, there is provided a method for capturing and analyzing a motion of a user performed by the device (110) as described above. An embodiment of the method (200) is described with reference to FIG. 3.

According to the method (200), a motion of a first user is captured by the depth camera (112) and a motion sequence of the first user is recorded as an RGB moving image and depth data (S210). Based on the RGB video, 2D skeletal data (i.e., 2D skeletons) is detected and obtained for each frame (S220). The 2D skeletal data is converted to 3D skeletal data by mapping the 2D skeletal data with corresponding depth data for each frame (S230). For example, the 2D skeletal data may include 2D skeletal coordinates, and the 2D to 3D conversion is applied by mapping the 2D skeletal coordinates with the corresponding depth data, which is also known as z values, for each frame.

Figure 3:
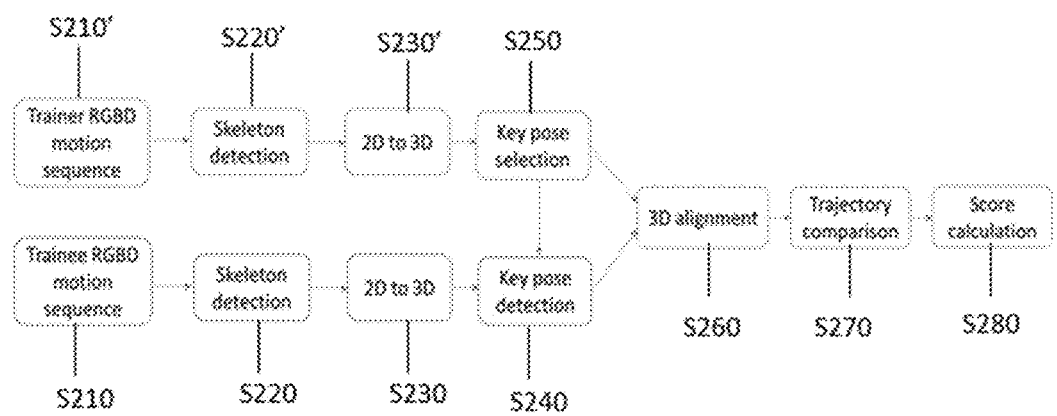
FIG. 3 is a flowchart showing a method for capturing and analyzing a motion of a user according to an embodiment of the present invention.

A similar process, i.e., the process including capturing of the motion of the first user (S210), obtaining the 2D skeletal data (S220), and converting the 2D skeletal data to the 3D skeletal data (S230), can be performed for a second user as illustrated in FIG. 3 as with the corresponding steps designated by S210', S220' and S230'. In one embodiment, the process for the second user can be conducted before the process for the first user is performed. The process for the second user can be conducted by another separate device (for capturing and analyzing user's motion) provided to the second user. Here, the second user may be an expert or a trainer who has ability to analyze the motion of the first user and give feedback to the first user.

After the 3D skeletal data for the first user and the 3D skeletal data for the second user have been obtained, one or more key poses of the motion of the first user are determined based on a preset condition for each of the key poses (S240). The preset condition for each of the key poses can be selected by the second user (S250). Or, the one or more key poses can be determined automatically based on the motion sequence. Once the one or more key poses of the first user are obtained, a motion sequence of the first user is segmented by the key poses into segments. In other words, the motion of the first user includes one or more key poses according to its motion sequence and can be segmented by the key poses into segments. Here, each segment may start from one key pose and end at another key pose.

Then, each segment is sampled and aligned with a corresponding segment of a set of standard key poses (S260). As described above, the set of standard key poses is provided by the second user (i.e., an expert or a trainer). By those standard key poses, the second user's motion sequence is segmented into segments. Each segment of the motion sequence of the first user is aligned with the corresponding segment of the motion sequence of the second user. The alignment can be performed by using, for example, Procrustes analysis, which calculates translation and optimal rotation by distribution of a skeleton in each frame.

Once the aligned segments are extracted for the first user and the second user, their trajectories can be obtained based on the aligned segments and compared between the one or more key poses of the motion of the first user and the set of standard key poses. Their trajectories can be compared by calculating difference between the 3D skeletal data of the one or more key poses by the first user and the 3D skeletal data of the set of standard key poses for each segment (S270). For example, difference of each keypoint on each skeleton in the segment is calculated. If the difference is within a predetermined threshold, the corresponding keypoint is considered as a matched point. In one example, the result of comparison can be represented by the score which is calculated by counting the number of the matched points over the total points in each segment (S280). The final score can be provided as the average of the scores in the segments.

It should be understood that the above only illustrates and describes examples whereby the present invention may be carried out, and that modifications and/or alterations may be made thereto without departing from the spirit of the invention.

It should also be understood that certain features of the invention, which are, for clarity, described in the context of separate embodiments, may also be provided in combination in a single embodiment. Conversely, various features of the invention which are, for brevity, described in the context of a single embodiment, may also be provided or separately or in any suitable sub-combination.

The invention claimed is:

1. A method for capturing and analyzing a motion of a user, comprising the following steps:
   A. capturing a motion of a first user represented by an RGB moving image and depth data;
   B. obtaining 2D skeletal data based on the RGB moving image for each frame;
   C. converting the 2D skeletal data to 3D skeletal data by mapping the 2D skeletal data with corresponding depth data for each frame;
   D. determining one or more key poses of the motion of the first user based on a preset condition for each of the key poses;
   E. obtaining the one or more key poses of the motion of the first user and segmenting a motion sequence by the key poses into segments;
   F. sampling each segment and aligning each segment with a corresponding segment of a set of standard key poses; and
   G. comparing trajectories obtained based on the aligned segments between the one or more key poses of the motion of the first user and the set of standard key poses,
   wherein the set of standard key poses comprises one or more key poses of a motion sequence of a captured motion of a second user,
   wherein the step of comparing trajectories includes calculating, for each segment, a difference between the 3D skeletal data of the one or more key poses by the first user and 3D skeletal data of the set of standard key poses.

2. The method of claim 1, further comprising, before step A, the following steps:
   capturing a motion of the second user represented by an RGB moving image and depth data;
   obtaining 2D skeletal data based on the RGB moving image for each frame for the second user; and
   converting the 2D skeletal data to 3D skeletal data by mapping the 2D skeletal data with corresponding depth data for each frame for the second user.

3. The method of claim 2, wherein step D includes determining the one or more key poses of the motion of the first user based on a preset condition for each of the key poses selected by the second user.

4. The method of claim 1, wherein step D includes automatically determining the one or more key poses of the motion of the first user based on its motion sequence.

5. The method of claim 1, further including step H of determining if the difference is within a predetermined threshold.

6. The method of claim 1, wherein each segment starts from one key pose and ends at another key pose.

7. A device for capturing and analyzing a motion of a user, comprising:
   a depth image capturing device for capturing a motion of a first user represented by an RGB moving image and depth data; and
   a processor connected to the depth image capturing device, the processor being configured to:
   obtain 2D skeletal data based on the RGB moving image for each frame;
   convert the 2D skeletal data to 3D skeletal data by mapping the 2D skeletal data with corresponding depth data for each frame;
   determine one or more key poses of the motion of the first user based on a preset condition for each of the key poses;
   obtain the one or more key poses of the motion of the first user and segment a motion sequence by the key poses into segments;
   sample each segment of the key poses of the motion and align each segment with a corresponding segment of a set of standard key poses; and
   compare trajectories obtained based on the aligned segments between the one or more key poses of the motion of the first user and the set of standard key poses,
   wherein the set of standard key poses comprises one or more key poses of a motion sequence of a captured motion of a second user,
   wherein the processor is further configured to compare trajectories obtained based on the aligned segments between the one or more key poses of the motion of the first user and the set of standard key poses, by calculating, for each segment, a difference between the 3D skeletal data of the one or more key poses by the first user and 3D skeletal data of the set of standard key poses.

8. The device of claim 7, wherein the depth image capturing device is further configured to capture a motion of the second user represented by an RGB moving image and depth data.

9. The device of claim 8, wherein the processor is further configured to obtain 2D skeletal data based on the RGB moving image for each frame for the motion of the second user, and convert the 2D skeletal data to 3D skeletal data by mapping the 2D skeletal data with corresponding depth data for each frame.

10. The device of claim 8, wherein the processor is further configured to determine the one or more key poses of the motion of the first user based on a preset condition for each of the key poses selected by the second user.

11. The device of claim 7, wherein the processor is further configured to automatically determine the one or more key poses of the motion of the first user based on its motion sequence.

12. The device of claim 7, wherein the processor is further configured to determine if the difference is within a predetermined threshold.

13. The method of claim 7, wherein each segment starts from one key pose and ends at another key pose.

14. The device of claim 7, wherein the processor is connected to an audio-visual presenting device to show the motion of the first user and/or the motion of the second user.

15. The device of claim 14, wherein the processor is further configured to send the audio-visual presenting device a result of the comparison between the trajectories of the one or more key poses of the motion of the first user and the set of standard key poses for display.

* * * * *